US012744586B2

(12) United States Patent
Dreiling

(10) Patent No.: US 12,744,586 B2
(45) Date of Patent: Sep. 22, 2026

(54) SYSTEM AND METHOD FOR EFFICIENT SCANNING OF SATELLITE COVERAGE UTILIZING 3GPP-BASED SYSTEMS

(71) Applicant: T-MOBILE INNOVATIONS LLC, Overland Park, KS (US)

(72) Inventor: Ryan P. Dreiling, Shawnee, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 338 days.

(21) Appl. No.: 18/456,344

(22) Filed: Aug. 25, 2023

(65) Prior Publication Data

US 2025/0070857 A1 Feb. 27, 2025

(51) Int. Cl.
*H04B 7/185* (2006.01)
*H04W 76/10* (2018.01)

(52) U.S. Cl.
CPC ........ *H04B 7/18513* (2013.01); *H04W 76/10* (2018.02)

(58) Field of Classification Search
CPC ............ H04B 7/18513; H04B 7/18539; H04B 7/18541; H04W 76/10; H04W 76/30; H04W 84/06
See application file for complete search history.

(56) References Cited

U.S. PATENT DOCUMENTS 11,031,999 B1 * 6/2021 Liu ......................... H04L 67/61
2019/0082481 A1 * 3/2019 Ravishankar ......... H04W 76/10
2022/0109496 A1 * 4/2022 Shrestha ............ H04B 7/18519
2024/0049171 A1 * 2/2024 Khirallah ........... H04B 7/18513
2024/0088991 A1 * 3/2024 Zhu ...................... H04B 7/1851
2024/0171260 A1 * 5/2024 Milne ................... H04W 60/00

FOREIGN PATENT DOCUMENTS

KR 10-2022-0097291 A 7/2022

OTHER PUBLICATIONS

Chen et al., "Discussion on the discontinuous coverage for IoT-NTN", 3GPP TSG-RAN WG2 Meeting #121, Feb. 27-Mar. 3, 2023, 2 pages.
Extended European Search Report received for European Application No. 24193861.2, mailed on Feb. 21, 2025, 13 pages.
Qualcomm Incorporated : "Satellite visit time for non-continuous coverage", 3GPP TSG-RAN WG2 Meeting #116-e, Nov. 1-12, 2021, 4 pages.

* cited by examiner

*Primary Examiner* — Ayman A Abaza
(74) *Attorney, Agent, or Firm* — SHOOK, HARDY & BACON L.L.P.

(57) ABSTRACT

The technology disclosed herein relates to enhancing satellite coverage and improving user device experiences. For example, the technology discussed herein can include establishing a radio resource control (RRC) connection between a first satellite and a user device (e.g., an active or idle RRC connection). Based on the RRC connection, the first satellite can generate a message (e.g., an RRC connection release message) that includes a next satellite pass parameter within a field of the message. Based on the satellite transmitting the next satellite pass parameter to the user device, the user device can initiate one or more user device actions. For example, the user device can initiate a timer corresponding to scanning for a frequency band of the second satellite corresponding to the next satellite pass parameter.

20 Claims, 7 Drawing Sheets

300

Direction: E-UTRAN to UE

*RRCConnectionRelease message*

```
-- ASN1START

RRCConnectionRelease ::=            SEQUENCE {
    rrc-TransactionIdentifier           RRC-TransactionIdentifier,
    criticalExtensions                  CHOICE {
        c1                                  CHOICE {
            rrcConnectionRelease-r8             RRCConnectionRelease-r8-IEs,
            spare3 NULL, spare2 NULL, spare1 NULL
        },
        criticalExtensionsFuture            SEQUENCE {}
```

FIG. 3

SYSTEM AND METHOD FOR EFFICIENT SCANNING OF SATELLITE COVERAGE UTILIZING 3GPP-BASED SYSTEMS

CROSS-REFERENCE TO RELATED APPLICATIONS

This application is related to U.S. patent application Ser. No. 18/456,358, filed on Aug. 25, 2023, and entitled "ANTICIPATED LOSS OF SATELLITE COVERAGE," which is hereby incorporated by reference in its entirety.

SUMMARY

This summary provides a high-level overview of various aspects of the technology disclosed herein, and the detailed-description section below provides further description herein. This summary is not intended to identify key features or essential features of the claimed subject matter, nor is it intended to be used as an aid in isolation to determine the scope of the claimed subject matter. The present disclosure is directed, in part, to technology associated with efficient scanning of satellite coverage (e.g., in a 3GPP-based system) based on satellite coverage by a first satellite and a second satellite, substantially as shown in and/or described in connection with at least one of the figures, and as set forth more completely in the claims.

In aspects set forth herein, and at a high level, the technology described herein relates to generating a message (e.g., corresponding to an RRC connection between a first satellite and user device) having particular information within one or more fields of the message, wherein the one or more fields assist a user device with performing cell search for a satellite. For example, the particular information within the message may include a next satellite pass parameter. In embodiments, the next satellite pass parameter can correspond to a service provided by a second satellite, via a frequency band, to the user device that is located within a particular geographical area. To further illustrate, a user device located within a particular geographical area (e.g., at a particular altitude, at a particular geographical area outside of a threshold range of a terrestrial cell site coverage area) may have a duration of time (e.g., in seconds) until the second satellite will provide the service to the user device within the particular geographical area. Based on receiving the message having the particular information in the one or more spare fields, the user device can initiate one or more actions.

In embodiments, the user device action initiated by the one or more spare fields may include initiating a timer associated with scanning for the frequency band of the second satellite, the timer being based on the time in which the second satellite will provide the service. In other embodiments, the user device can provide an alert or another type of notification to a user of the user device (e.g., via a graphical user interface) that indicates to the user that one or more services will be unavailable for a particular time period and/or duration. As another example, the user device can transmit an RRC connection request to the second satellite based on receiving the message and based on the duration of time until the second satellite will provide the service to the user device within the particular geographical area. The user device may also initiate other types of user device actions based on the one or more spare fields that include particular information within the message received by the user device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIG. 3 illustrates an example radio resource control connection release message, with generated information in a spare field, for transmission to the user device, in accordance with aspects herein;

DETAILED DESCRIPTION

Figure 1:
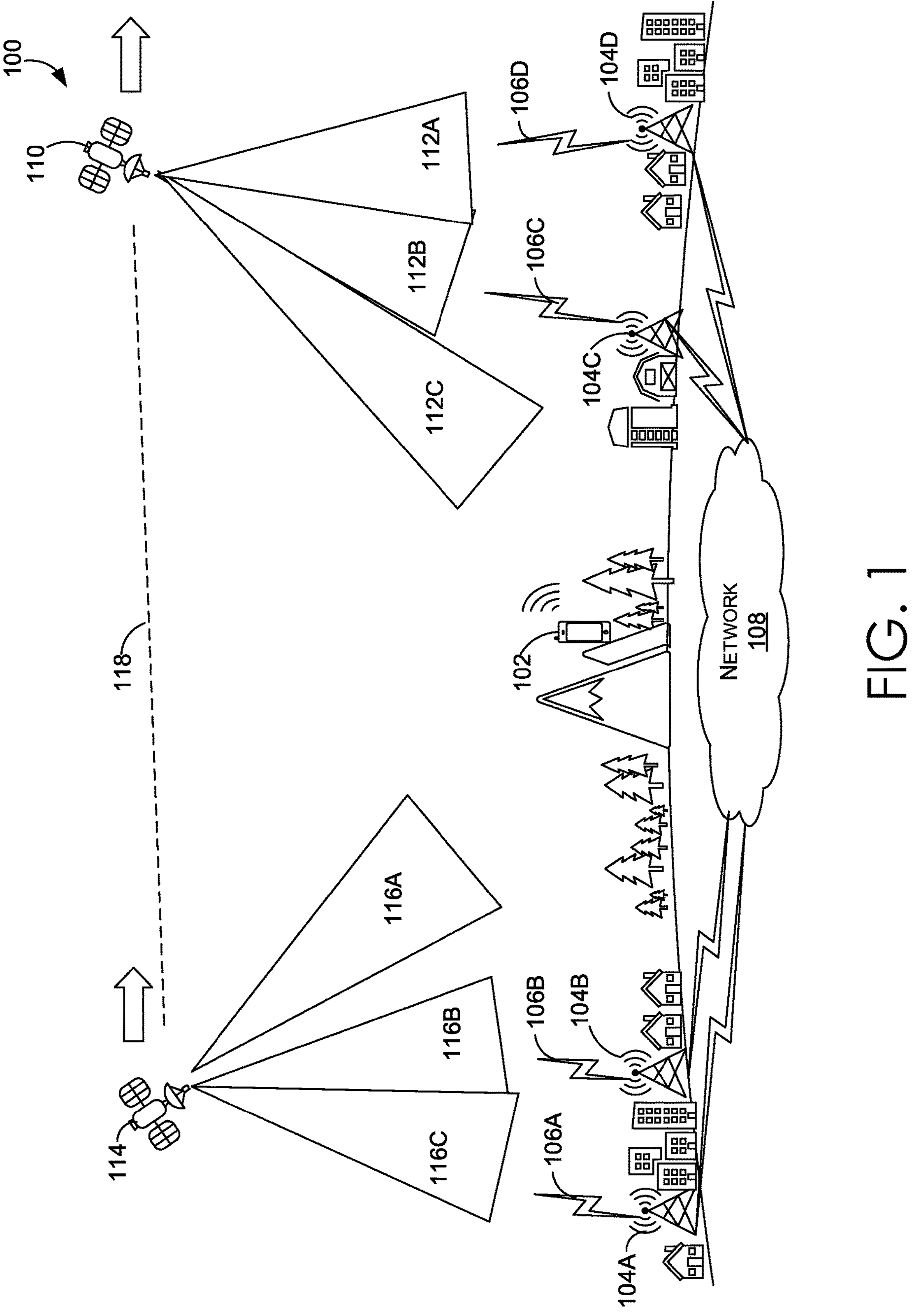
FIG. 1 depicts an example operating environment for improved satellite coverage, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System
CD-ROM Compact Disk Read Only Memory
CDMA Code Division Multiple Access
eNB Evolved Node B
gNB Next Generation Node B
GPRS General Packet Radio Service GSM Global System for Mobile communications
DVD Digital Versatile Discs
EEPROM Electrically Erasable Programmable Read Only Memory
EN-DC E-UTRA NR Dual Connectivity
E-UTRA Evolved Universal Terrestrial Radio Access
E-UTRAN Evolved Universal Terrestrial Radio Access Network
Ev-DO Evolution Data Optimized
FD-MIMO Full-Dimension Multiple-Input Multiple-Output
GPS Global Positioning System
IoT Internet of Things
LAN Local Area Network
LTE Long Term Evolution
MIMO Multiple-Input Multiple-Output
mm wave Millimeter wave
MME Mobility Management Entity
MU-MIMO Multi-User Multiple-Input Multiple-Output
NAT Network Access Technology
NR New Radio
PC Personal Computer
PDA Personal Digital Assistant
PLMN Public Land Mobile Network
RAM Random Access Memory
RAN Radio Access Network
RF Radio-Frequency
ROM Read Only Memory
RRC Radio Resource Control
RSRP Reference Signal Received Power
RSRQ Reference Transmission Receive Quality
RSSI Received Signal Strength Indicator
SNR Signal-to-Noise Ratio
SRS Sound Reference Signal
TDMA Time Division Multiple Access
VLAN Virtual Local Area Network In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more." The term "plurality" may refer to "more than one."

The term "combination" (e.g., one or more combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

As used herein, the phrase "based on" shall be construed as a reference to an open set of conditions. For example, an example step that is described as "based on X" may be based on both X and additional conditions, without departing from the scope of the present disclosure. In other words, as used herein, the phrase "based on" shall be construed in the same manner as the phrase "based at least in part on."

The term "mm wave," as used herein, may refer to the extremely high frequency band (e.g., from 30 GHz to 300 GHz). Additionally or alternatively, in some embodiments, a millimeter wave transmission may include one or more frequency ranges of 24 GHZ, 26 GHZ, 28 GHZ, 39 GHZ, and 52.6-71 GHz.

The term "NAT," as used herein, is synonymous with wireless communication protocol and is an umbrella term used to refer to the particular technological standard/protocol that governs the communication between a UE and a base station. Examples of a NAT may include 3G, 4G, 5G, 6G, 802.11x, another type of NAT, or one or more combinations thereof.

Additionally, a "user device," as used herein, is a device that has the capability of transmitting or receiving one or more signals to or from an access point, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal). A user device may be, in an embodiment, user device 102 described herein with respect to FIG. 1, user device 202 described herein with respect to FIG. 2, or user device 700 described herein with respect to FIG. 7.

In embodiments, a user device may include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof.

In some aspects, the user device is a wearable device having a camera, microphone, RFID, GPS, another sensor, or one or more combinations thereof. A wearable device (or another type of user device) can transmit the data obtained by their corresponding sensor(s) (e.g., to another user device, to a server). In embodiments, a user device can access sensors, application data, tracking data, map data, other user device data, or one or more combinations thereof, for packet transmissions (e.g., to another user device). In some embodiments, a wearable device can be a watch-type electronic device, a glasses-type wearable device, an upper-torso wearable device, another type of wearable device, or one or more combinations thereof.

In embodiments, a user device discussed herein may be configured to communicate using one or more of 4G (e.g., LTE), 5G, 6G, another generation communication system, or one or more combinations thereof. In some aspects, the user device may be an EN-DC user device. In some embodiments, the user device can connect to a 5G gNB that acts as a master node, and another type of node that acts as a secondary node.

A "wireless telecommunication service" refers to the transfer of information without the use of an electrical conductor as the transferring medium. Wireless telecommunication services may be provided by one or more telecommunication network providers. Wireless telecommunication services may include, but are not limited to, the transfer of information via radio waves (e.g., Bluetooth®), satellite communication, infrared communication, microwave communication, Wi-Fi, mm wave communication, and mobile communication. Embodiments of the present technology may be used with different wireless telecommunication technologies or standards, including, but not limited to, CDMA 1×Advanced, GPRS, Ev-DO, TDMA, GSM, WiMAX technology, LTE, LTE Advanced, other technologies and standards, or one or more combinations thereof. For example, in an embodiment, the present technology discussed herein may be used in a 3GPP-based system.

A "network" (e.g., network 108 of FIG. 1) can provide one or more wireless telecommunication services and may transmit or receive a wireless signal to or from a user device. In embodiments, a network may be one or more telecommunications networks, or a portion thereof. The network might include an array of devices or components (e.g., one or more base stations). Additionally or alternatively, the network can include multiple networks, and the network can be a network of networks. In embodiments, the network or a portion thereof may be a core network, such as an evolved packet core or 5G core, which may include a control plane entity (e.g., a mobility management entity), a user plane entity (e.g., a serving gateway), and an access and mobility management function. In some embodiments, the network may comprise one or more public or private networks—wherein one or more of which may be configured as a satellite network (e.g., a 3GPP non-terrestrial network), a publicly switched telephony network, a cellular telecommunications network, another type of network, or one or more combinations thereof.

In embodiments, the network may comprise the satellite network connecting one or more gateways (e.g., a device or a system of components configured to provide an interface between the network and a satellite) to other networks, a cellular core network (e.g., a 4G, 5G, of 6G core network, an IMS network, and the like), a data network, another type of network, or one or more combinations thereof. In such embodiments, each of the satellite network and the cellular core network may be associated with a network identifier, such as a public land mobile network, a mobile country code, a mobile network code, or the like, wherein the network identifier associated with the satellite network is the same or different than the network identifier associated with the cellular network.

In embodiments, the network (including the satellite network) can connect one or more user devices to a service provider for services such as 5G and LTE, for example. In aspects, a service provided to a user device may comprise one or more of a voice service, a message service (e.g., SMS messages, MMS messages, instant messaging messages, an EMS service messages), a data service, other types of wireless telecommunication services, or one or more combinations thereof. The network can comprise any communication network providing voice, message, or data service(s), such as, for example, a 1x circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof. Components of the network, for example, may include terminals, links, gateways, nodes (e.g., a core network node), relay devices, integrated access and backhaul nodes, other types of network components, or one or more combinations thereof.

As used herein, the term "base station" refers to a centralized component or system of components configured to wirelessly communicate (e.g., receive and/or transmit signals) with various devices or components (e.g., a user device, a relay device) in a particular geographical area. A base station may be referred to as one or more cell sites, nodes, gateways, remote radio unit control components, base transceiver stations, access points, NodeBs, eNBs, gNBs, Home NodeBs, Home eNodeBs, macro base stations, small cells, femtocells, relay base stations, another type of base station, or one or more combinations thereof. A base station may be, in an embodiment, similar to base stations 104A-104D described herein with respect to FIG. 1.

The term "satellite," as used herein, is an extraterrestrial base station that is distinguished from a terrestrial base station on the basis of its lack of ground coupling. Some examples of a satellite can include a space satellite, a balloon, a dirigible, an airplane, a drone, an unmanned aerial vehicle, a geosynchronous or geostationary earth orbit satellite, a low earth orbit satellite, a medium earth orbit satellite, a bent-pipe satellite, a regenerative satellite, another type of satellite, or one or more combinations thereof. A satellite may be, in an embodiment, similar to satellites 110 and 114 described herein with respect to FIG. 1, similar to satellites 204 and 206 described herein with respect to FIG. 2, or similar to satellite 602 described herein with respect to FIG. 6.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Satellite RANs will be/are being integrated with cellular telecommunication networks (e.g., in a 3GPP-based system). In various topographies of a terrestrial geographical area, as well as during early phases of satellite deployments, there may be locations where a user device will be beyond the reach of a terrestrial RAN or a satellite RAN. Unlike stationary terrestrial base stations, connections between a UE and a satellite are subject to movement of the satellite station. Further, unlike a terrestrial base station's coverage beam, a satellite's coverage beam may not sweep across the ground as the satellite traverses overhead and instead remains fixed over a given terrestrial geographical area. Furthermore, because of the ubiquitous network coverage between home PLMN and roaming PLMNs, a UE rarely expects to wholly depart a wireless coverage area—meaning that disruptions due to a lack of coverage are typically anomalous and temporary. As such, particularly during early deployments of satellite coverage, a UE well beyond terrestrial coverage areas is likely to experience intermittent periods of satellite coverage.

The integration of the satellite RANs with cellular telecommunication networks can result in high traffic load or congestion from numerous information relay and forwarding that can cause latency for UEs. Additionally or alternatively, this latency can result for user devices within a terrestrial geographical area where the UE is temporarily out of satellite coverage from the satellite's coverage beam remaining fixed over the terrestrial geographical area. As such, if a user needs to make a call or establish a data session (e.g., for Internet browsing, a messaging service, Voice over IP, gaming, High Frequency Trading) via a user device, then it would be helpful for the user to know when the user device will be within a satellite coverage area, when the user device will not be within the satellite coverage area, when the user device will be within a different satellite coverage area, and when and how to connect to the different satellite coverage areas. Furthermore, it may be advantageous to notify users or take some action at the UE in order to take advantage of limited coverage windows.

Accordingly, aspects of the present disclosure are directed to improved systems that include one or more satellites, wherein these improved systems can generate a message (e.g., corresponding to an RRC connection between a satellite and user device) having particular information within one or more spare fields of the message, such that the one or more spare fields trigger one or more particular user device actions that correspond to the UE having temporary out-of-satellite-coverage and that correspond to the UE experiencing a change to satellite-coverage. In this way, users of user devices can better plan the timing and duration of calls and data sessions. Additionally, the technology disclosed herein also provides for reduced user device battery consumption and reduction of expended resources due to the user device reducing the exhaustive scanning of supported technologies, bands, and frequencies in an effort to find coverage, since the particular information in the spare field(s) can provide user devices with the data corresponding to the temporary out-of-satellite-coverage and changes to satellite-coverage (e.g., providing the user device with a next satellite pass parameter). Furthermore, the technology disclosed herein can improve communications between or among user devices (and/or other devices) by improving quality of service and user experience. In this way, the technology and corresponding techniques disclosed herein can enhance the reliability and functionality of communications.

In an embodiment, a system is provided for enhancing satellite coverage. The system comprises one or more processors corresponding to a first satellite and computer memory storing computer-usable instructions that, when executed by the one or more processors, cause the one or more processors to perform operations. The operations comprise establishing a radio resource control (RRC) connection between the first satellite and a user device, the user device being located within a particular geographical area. The operations also comprise transmitting a message (e.g., an RRC connection release message) to the user device, the message including a next satellite pass parameter within a spare field of the message, the next satellite pass parameter corresponding to a service provided by a second satellite, via a frequency band, to the user device within the particular geographical area.

In another embodiment, a method is provided for enhancing satellite coverage. The method comprises establishing a first radio resource control (RRC) connection between a first satellite and a user device located within a particular geographical area. The method also comprises transmitting a message to the user device, the message including a next satellite pass parameter within a spare field of the message, the next satellite pass parameter corresponding to a next satellite pass of the user device from the first satellite to a second satellite.

Another embodiment includes one or more non-transitory computer storage media having computer-executable instructions embodied thereon, that when executed by at least one processor, cause the at least one processor to perform a method. The method comprises establishing, via a user device located at particular geographical area, a radio resource control (RRC) connection with a first satellite. The method also comprises receiving, via the user device, a message from the first satellite, the message including a next satellite pass parameter within a spare field of the message, the next satellite pass parameter corresponding to a next satellite pass of the user device from the first satellite to a second satellite. The method also comprises causing an action by the user device based on the user device receiving the message.

Turning now to FIG. 1, example operating environment 100 is illustrated in accordance with one or more embodiments disclosed herein. At a high level, the example operating environment 100 comprises user device 102, base stations 104A-104D, communication links 106A-106D corresponding to base stations 104A-104D and satellites 110 and 114, network 108, satellite beams 112A-112C corresponding to the satellite 110, satellite beams 116A-116C corresponding to satellite 114, and communication link 118 corresponding to satellites 110 and 114. Example operating environment 100 is but one example of a suitable environment for the technology and techniques disclosed herein, and is not intended to suggest any limitation as to the scope of use or functionality of the invention. Neither should the environment 100 be interpreted as having any dependency or requirement relating to any one or combination of components illustrated. For example, other embodiments of example operating environment 100 may have more or less base stations or satellites. As another example, even though the user device 102 is illustrated in example operating environment 100 as a mobile phone, the user device 102 may also be another type of user device (e.g., a tablet, a wearable device). In yet another example, even though the satellites 110 and 114 are illustrated in example operating environment 100 as satellite vehicles, the satellites 110 or 114 may also be another type of satellite (e.g., a balloon or high altitude platform station, a dirigible, an airplane, a drone, an unmanned aerial vehicle).

User device 102 may be configured to wirelessly communicate (e.g., by transmitting or receiving one or more signals) with one or more base stations (e.g., base station 104A-104D), one or more satellites (e.g., satellites 110 and 114), other types of wireless telecommunication devices (e.g., core network nodes), or one or more combinations thereof. In example environment 100, network 108, base stations 104A-104D, satellites 110 and 114, or one or more combinations thereof, can provide one or more services (e.g., a data service (e.g., for Internet browsing, a Wi-Fi messaging service, Voice over IP, gaming, High Frequency Trading), a message service (e.g., SMS messages, MMS messages), an EMS service) to the user device 102.

In embodiments, the user device 102 may include one or more of a unit, a station, a terminal, or a client, for example. In some embodiments, the user device 102 may act as a relay. In some embodiments, the user device 102 may be a wireless local loop station, an IoT device, an Internet of Everything device, a machine type communication device, an evolved or enhanced machine type communication device, another type of user device, or one or more combinations thereof. As illustrated in example operating environment 100, the user device 102 is located within a particular terrestrial geographical area on a mountain. In some embodiments, the user device 102 is located at a particular altitude associated with one or more of the base stations 104A-104D. In some embodiments, the user device 102 is outside of a coverage area corresponding to one or more of the base stations 104A-104D. In other embodiments, the user device 102 may be located in a hot air balloon, on an airplane, or another system capable of transporting the user device to various altitudes.

The base stations 104A-104D in example environment 100 are dispersed throughout various geographical areas, and in some embodiments, the base stations 104A-104D can be in different forms or can have different capabilities. For example, base station 104C in example environment 100 is dispersed in a rural geographical area and base station 104D is dispersed in an urban geographical area. Further, the base stations 104A-104D may perform one or more of the following functions: transfer user data, radio channel ciphering, radio channel deciphering, integrity protection, header compression, mobility control functions (e.g., handover, dual connectivity), inter-cell interference coordination, connection setup and release, load balancing, distribution for non-access stratum messages, non-access stratum node selection, synchronization, RAN sharing, multimedia broadcast multicast service, subscriber and equipment trace, RAN information management, paging, positioning, delivery of a warning message, another type of base station functionality, or one or more combinations thereof. Even though the base stations 104A-104D are illustrated in example operating environment 100 as macro base stations, one or more of the base stations 104A-104D may also be another type of base station (e.g., a gateway node, such as a satellite dish).

Further, in some embodiments, one or more of base stations 104A-104D may communicate directly or indirectly (e.g., through the EPC 160 or 5G Core 190) with another base station over a backhaul link (e.g., using an X2 interface), which may be wired or wireless. In embodiments, one or more of the communication links 106A-106D (e.g., a feeder link) can connect one or more of the satellites 110 and 114 to the network 108 (e.g., a 5G network or another generation network). In other embodiments, one or more of satellites 110 and 114 can connect to the network 108 directly. As another example, in other embodiments, one or more of satellites 110 and 114 can connect to a separate terrestrial gateway via a feeder link.

In some embodiments, one or more of satellites 110 and 114 can connect to the network 108 via a network node embarked onboard the satellite 110 or satellite 114. For example, in embodiments wherein satellite 110 or satellite 114 has the one or more network nodes embarked onboard, the network node can connect to the user device 102 via a service link using a Uu interface. In yet another example, one or more of the satellites 110 and 114 may have one or more access nodes, such as one or more gNB components (e.g., a gNB distributed unit) onboard the satellite. Accordingly, the user device 102 can transmit or receive signals to or from one or more of the satellites 110 and 114.

The user device 102, in some embodiments, can transmit or receive signals to or from the satellite 110 or the satellite 114 via one or more satellite beams bands (e.g., via satellite beam 112C corresponding to satellite 110 or satellite beam 116A corresponding to satellite 114), wherein within each satellite beam 112A-112C and 116A-116C, each of the satellite 110 or satellite 114 may utilize one or more frequencies to wirelessly communicate with user devices, such as the user device 102. In some embodiments, two or more of the satellite beams 112A-112C of satellite 110 or two or more of frequency bands 116A-116C of satellite 114 have an angular spread that is close to zero. In embodiments, each of the satellite beams 112A-112C of satellite 110 or each of the satellite beams 116A-116C of satellite 114 have configurations (line-of-sight probability, angular spread, delay spread, etc.) that depend on the elevation angle of their respective satellite. In embodiments, path loss corresponding to one or more of the satellite beams 112A-112C or frequency bands 116A-116C and the user device 102 is based on attenuation from an object (e.g., a mountain or building structure) having an altitude, absorption by one or more atmospheric gases (e.g., nitrogen, oxygen, argon, carbon dioxide, neon, helium, methane, krypton, ozone, hydrogen, water vapor), ionospheric and tropospheric scintillation loss, a period of time (e.g., during a particular day) of high solar activity, satellite orbit, carrier frequency, elevation angle, another type of path loss factor, or one or more combinations thereof.

The user device 102 can establish an RRC connection with satellite 110 or satellite 114. For example, the user device 102 can transmit an RRC connection request or another type of request to satellite 110 or satellite 114. In some embodiments, the user device 102 can transmit an RRC connection request to satellite 110 on a frequency band used by the third satellite beam 112C of the satellite 110. Additionally or alternatively, the user device 102 can transmit an RRC connection request to satellite 114 on a frequency band used by the first satellite beam 116A of the satellite 114. Based on transmitting the RRC connection request or the other type of request, the user device 102 will monitor for one or more messages (e.g., an RRC Connection Setup, an RRC Connection Resume, an RRC Early Data Complete, an RRC Connection Release).

In embodiments, the user device 102 (e.g., having global navigation satellite system capabilities) can determine a relative signal speed between the user device 102 and the satellite 110 or satellite 114 or a round-trip time. For example, the user device 102 can determine a signal speed associated with the RRC connection request, the RRC connection setup message, the RRC connection release message, etc. As another example, in some embodiments, the user device 102 can determine a pre-compensation for a Doppler frequency for uplink transmissions to the satellite 110 and another pre-compensation for a Doppler frequency for uplink transmissions to the satellite 114. In this way, the user device 102 can monitor for the for one or more messages (e.g., an RRC Connection Setup, an RRC Connection Resume, an RRC Early Data Complete, an RRC Connection Release) based on determining the relative signal speed, round-trip time, another monitoring factor, or one or more combinations thereof. As another example, the user device can transmit the RRC connection request, another type of request, or other types of uplink data to the satellite 110 or 114 based on determining the pre-compensation for the Doppler frequency.

Additionally, the satellites 110 and 114 can broadcast services and provide coverage for user devices (e.g., IoT devices), provide mission critical access (e.g., during an emergency situation), provide other types of satellite services, protocols, or functionality, or one or more combinations thereof. In embodiments, satellites 110 and 114 can be configured to communicate with each other (e.g., via communication link 118). For example, the communication link 118 may include a free space optical link, a microwave link, electromagnetic wave signals via mm wave signals, optical signals via a laser, another type of communication link, or one or more combinations thereof. As another example, the communication link 118 can correspond to a wireless common public radio interface protocol, a dedicated wireless front haul protocol developed for high-altitude-to-high-altitude, another protocol, or one or more combinations thereof. In some embodiments, the satellite 114 can transmit a frequency band identifier that identifies frequency band 116A, 116B, or 116C (e.g., a carrier frequency in MHz or channel number frequency range) to the satellite 110 via the communication link 118. In some embodiments, the satellite 114 can transmit coverage area data (e.g., geographical coordinates, crowd-sourced network performance data), corresponding to the frequency band 116A, 116B, or 116C, to the satellite 110 via the communication link 118.

In embodiments, based on the satellite 110 establishing an RRC connection with the user device 102 (or based on receiving an RRC connection request from the user device, for example), the satellite 110 can transmit a message (e.g., an RRC connection release message) to the user device 102, the message including one or more next satellite pass parameters within a field of the message. In embodiments, one or more next satellite pass parameters may correspond to a service provided by satellite 114 (e.g., Internet browsing, a messaging service, Voice over IP, gaming, High Frequency Trading) to the user device 102 within the particular geographical area in which the user device 102 is located (e.g., in particular terrestrial geographical area on a mountain, outside of a coverage area corresponding to one or more of the base stations 104A-104D, outside of a coverage area corresponding to third satellite beam 116C, outside of a coverage area corresponding to second satellite beam 112B, within a hot air balloon traveling within an altitude range and at a particular velocity, within an airplane traveling at an altitude).

In embodiments, the one or more next satellite pass parameters may comprise a timing element that can be used by the user device 102 to time cell searches. Such a timing element may be communicated by satellite 110 as it stops providing coverage for the user device 102, indicating a time that the satellite 114 is anticipated to provide coverage for the geographic area associated with the location of the user device 102. Alternatively, the timing element may be communicated as a countdown timer, the expiration of which can be used by the user device 102 to perform cell search for the satellite 114. In aspects, the timing element may be specifically associated with a particular service offered by the satellite 114 (e.g., a first timing element may be communicated with a first service type and a second timing element may be communicated with a second service type), or service-agnostic (e.g., a single timing element is communicated about the anticipated coverage of satellite 114 because any service is expected, even though the second service type may not necessarily be available). Further, in addition to the timing element providing an indication of an anticipated onset of coverage from satellite 114, the timing element may provide an indication of when the anticipated coverage from satellite 114 will end—allowing the user device 102 to know when, and for how long, it will have service.

In some embodiments, the message may also include a service gap parameter within another field of the message, wherein the service gap parameter corresponds to a duration of time that neither satellite 110 nor satellite 114 will provide service to the user device 102 within the particular geographical area. For example, one field within the message transmitted by satellite 110 may contain a time at which the user device 102 will begin to receive service from the satellite 114 and another field may contain a number of seconds in which the user device will not receive service from either the satellite 110 or the satellite 114. As another example, the satellite 110 may transmit a first message having a first field including the duration of time (e.g., in seconds) until the satellite 114 will provide service to the user device 102 and a second message having a first field including the service gap parameter. In yet another example, in some embodiments, a first spare field within the message transmitted by satellite 110 to the user device 102 includes a duration of time (e.g., in seconds) until the satellite 114 will provide a first service to the user device 102, and a second field within the message includes a duration of time until the satellite 114 will provide a second service to the user device 102, wherein the first service is a different service than the second service. In some embodiments, these two messages may be sent simultaneously to the user device 102.

In embodiments, one or more next satellite pass parameters may correspond to a frequency used by a satellite (e.g., such as the satellite 114) that is anticipated to provide coverage for user device 102 subsequent to satellite 110. For example, the satellite 110 may communicate a frequency band identifier, frequency range, or the like, to the user device 102 for use in a subsequent cell search. By scanning, or beginning the cell search by scanning, the frequencies communicated in the one or more next satellite pass parameters, the user device 102 will more quickly obtain and process synchronization information, enabling faster attachment to satellite 114.

In some embodiments, after transmitting an initial message to user device 102 having the next satellite pass parameter, the satellite 110 or 114 can also transmit another message to the user device 102 (e.g., another RRC connection release message) within a threshold period of time, wherein the threshold period of time corresponds to the duration of time (e.g., in milliseconds) until the satellite 114 will provide service to the user device 102, or wherein the threshold period of time corresponds to a time period for which the user device will not receive service from either the satellite 110 or the satellite 114. In some embodiments, the subsequent message can include an updated next satellite pass parameter. For example, the updated next satellite pass parameter can correspond to a shorter time in which the satellite 114 will begin to provide service to the user device 102. In some embodiments, the satellite 110 or satellite 114 can transmit the subsequent message to the user device 102 based on establishing a subsequent RRC connection with the user device 102 or based on receiving an RRC connection resume request from the user device 102.

In some embodiments, the next satellite pass parameter is transmitted to the user device 102 based on determining a location or an anticipated course (e.g., an area on a path of a mountain having one or more trees obstructing signals from the satellite beam 112C of satellite 110 providing service to the user device) of the user device 102. For example, the next satellite pass parameter may be determined based on the user device 102 being located outside of a particular geographical coverage area associated with one or more of the base stations 104A-104D. In some embodiments, the satellite 110 transmitting the next satellite pass parameter to the user device 102 may determine the location of the user device 102 based on circuitry processing resources of the user device 102 corresponding to location related measurements obtained by the user device 102. As another example, the location of the user device 102 (e.g., associated with a latitude and longitude of the user device 102) can be determined based on a Satellite Positioning System or Global Navigation Satellite System, such as GPS, GLObalnaya NAvigatsionnaya Sputnikovaya Sistema, Galileo, BeiDou, Indian Regional Navigation Satellite System, European Geostationary Navigation Overlay Service, Wide Area Augmentation System, another type of positioning technique, or one or more combinations thereof.

In some embodiments, the location of the user device 102 can be determined by satellite 110 based on the satellite 110 receiving an RRC connection request from the user device 102. For example, the satellite 110 can determine the location of the user device 102 in response to receiving the RRC connection request. As another example, the satellite 110 can determine the location based on the user device 102 transmitting location data to the satellite 110 with the RRC connection request. In some embodiments, the satellite 114 can transmit the next satellite pass parameter, for servicing the user device 102, to the satellite 110 via the communication link 118 so that the satellite 110 can transmit the message including the next satellite pass parameter to the user device 102.

In some embodiments, the next satellite pass parameter is determined (e.g., by the satellite 110, satellite 114, satellite network components onboard the respective satellite, or one or more combinations thereof) based on large-scale parameters (line-of-sight probability, angular spread, delay spread, etc.) and an elevation angle of the respective satellite and corresponding frequency band. In one example, the next satellite pass parameter corresponding to the next satellite pass from the satellite 110 to the satellite 114 is based on a large scale parameter and elevation angle corresponding to the satellite 114 and the satellite beam 116A. As another example, in some embodiments, the next satellite pass parameter is determined based on path loss associated with the satellite beam 116A and attenuation from an object (e.g., a tree on a mountain). In some embodiments, the next satellite pass parameter is determined based on absorption by one or more atmospheric gases (e.g., nitrogen, oxygen, argon, carbon dioxide, neon, helium, methane, krypton, ozone, hydrogen, water vapor), a concentration of one or more of those atmospheric gases, a carrier frequency of the satellite beam 116A, ionospheric and tropospheric scintillation loss, solar activity levels, an orbit of the satellite 114, another factor corresponding to the satellite beam 116A, or one or more combinations thereof.

Figure 2:
FIG. 2 depicts another example operating environment for improved satellite coverage, in accordance with aspects herein.
Figure 2:
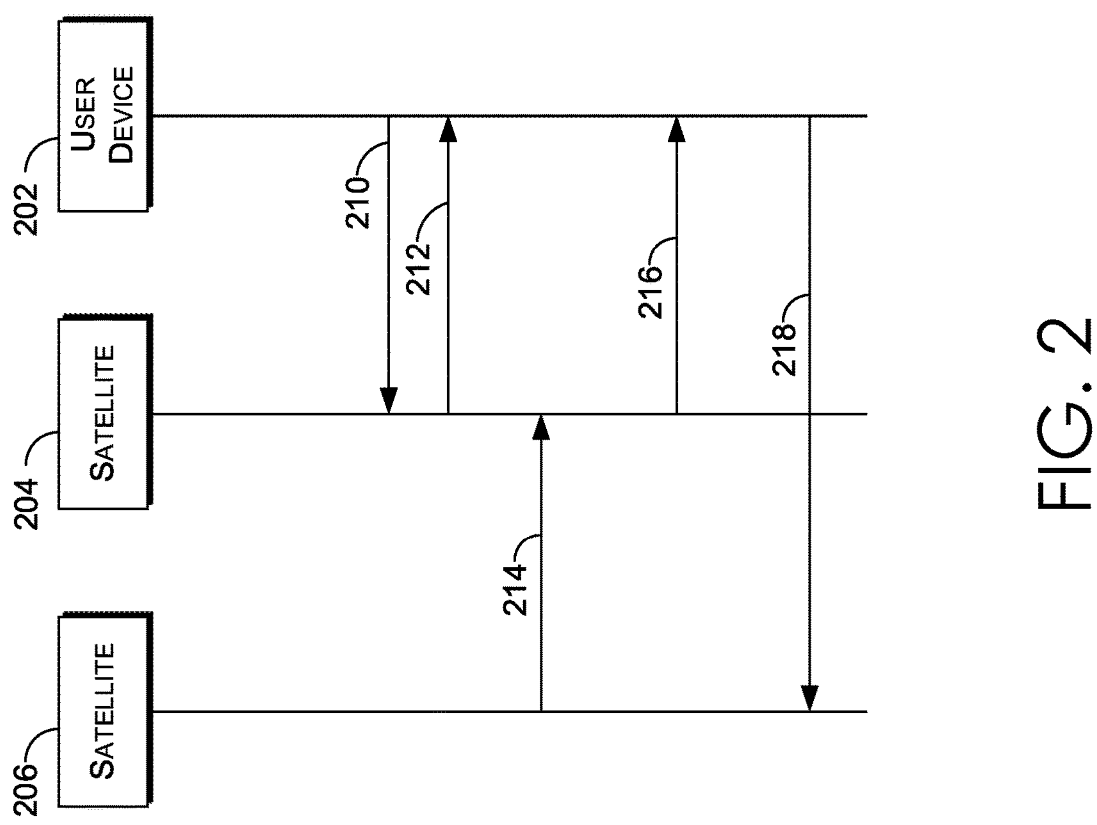

Turning to FIG. 2, an exemplary call flow 200 includes user device 202, a first satellite 204, a second satellite 206, and transmissions 210-218. The call flow 200 is but one example of a suitable sequence of interactions between the user device 202 and one or more satellites, and is not intended to suggest any limitation as to the scope of use or functionality of the invention. Neither should call flow 200 be interpreted as having any dependency or requirement relating to any one or combination of components illustrated. For example, other embodiments of example call flow 200 may have more or less user devices or satellites. As another example, even though the transmission 214 from the second satellite 206 is illustrated as occurring after the 212 transmission from the first satellite 204, the transmission 214 may occur at a different time relative to the 212 transmission (e.g., before the 212 transmission). In yet another example, even though the transmission 214 from the second satellite 206 is illustrated as occurring before the 216 transmission from the first satellite 204, the transmission 214 may occur at a different time relative to the 216 transmission (e.g., after the 216 transmission). In yet another example, even though the transmission 214 is illustrated as being received by the first satellite 204 from the second satellite 206, in other embodiments, the transmission 214 may be transmitted by the second satellite 206 to a base station and received by the first satellite 204 from the base station.

Figure 6:
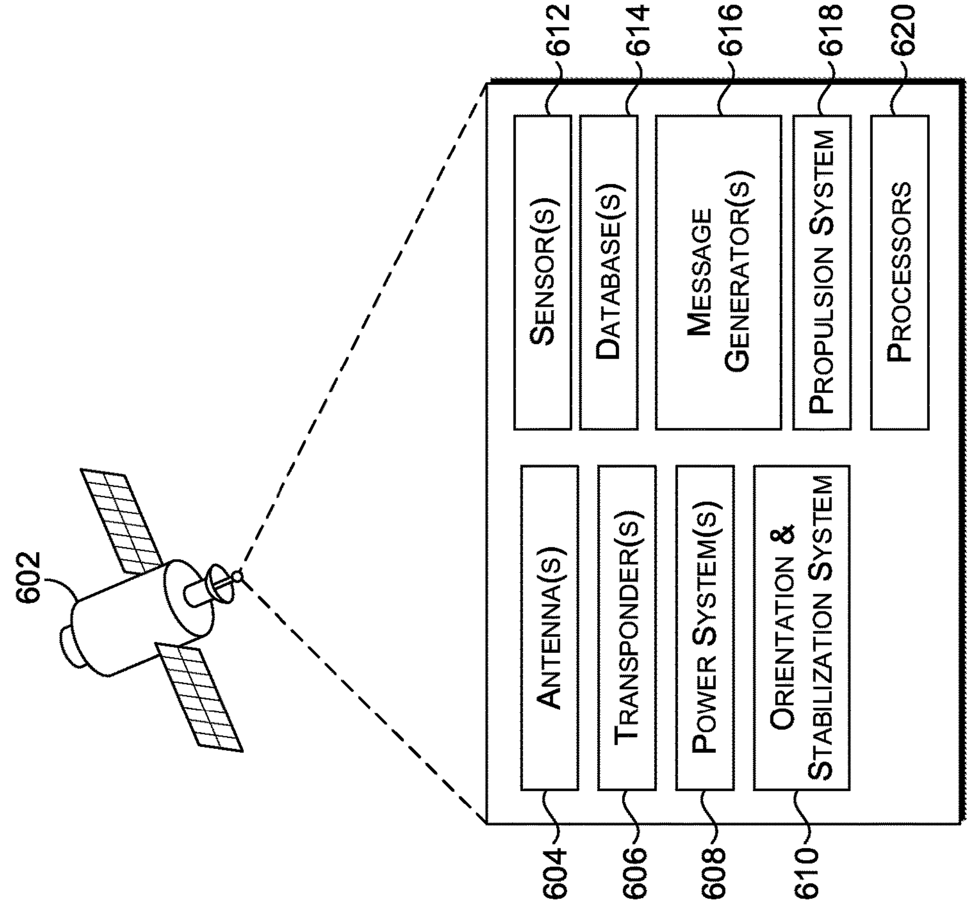
FIG. 6 depicts an example satellite for use in implementations of the present disclosure, in accordance with aspects herein.
Figure 7:
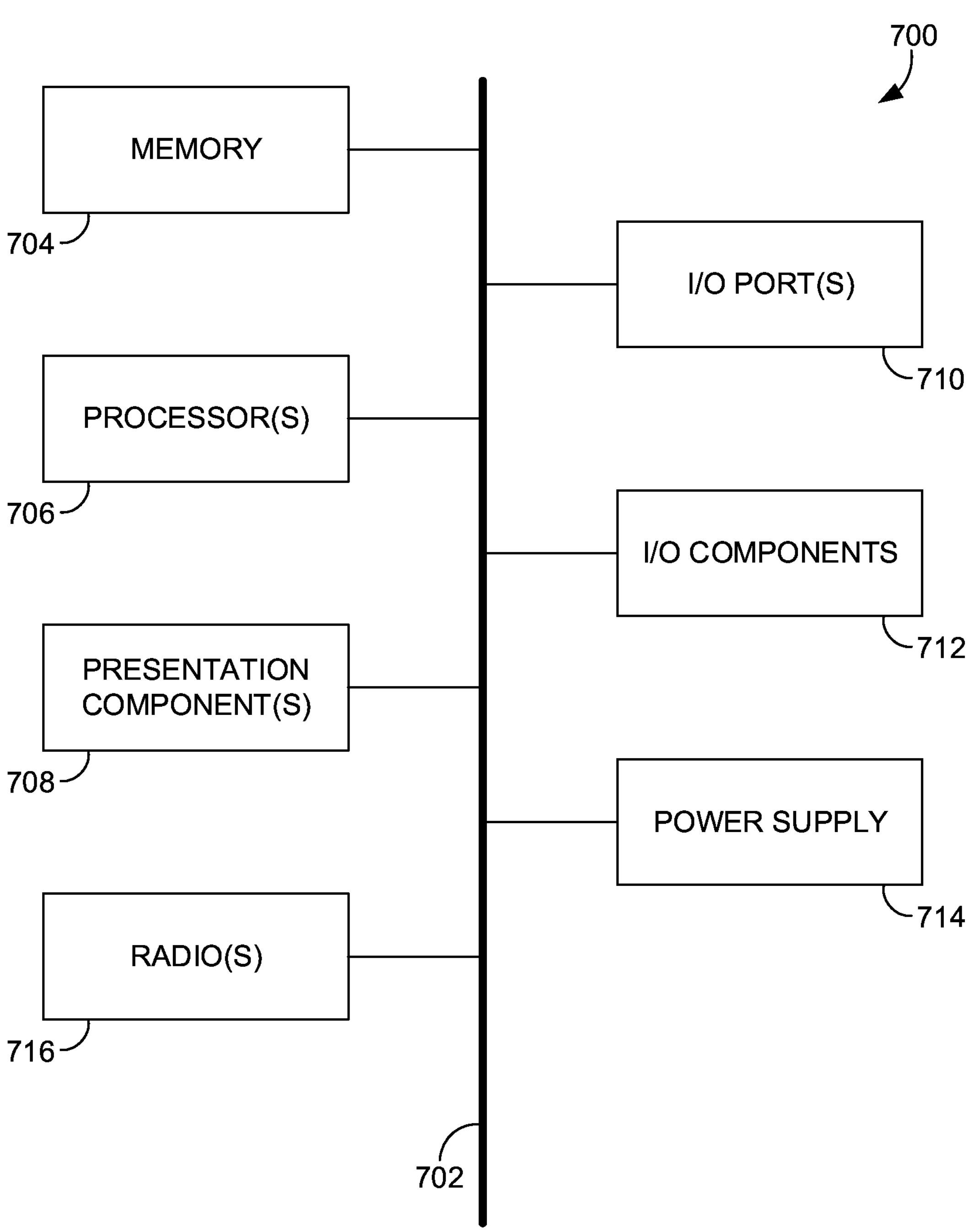
FIG. 7 depicts an example user device suitable for use in implementations of the present disclosure, in accordance with aspects herein.

User device 202, in embodiments, may be the user device 102 of FIG. 1 or the user device 700 of FIG. 7. In some embodiments, the first satellite 204 may be the satellite 110 of FIG. 1 or the satellite 602 of FIG. 6. In some embodiments, the second satellite 206 may be the satellite 114 of FIG. 1 or the satellite 602 of FIG. 6.

In call flow 200, the user device 202 transmits an RRC connection request to the first satellite 204 via transmission 210. Based on the RRC connection request, the first satellite 204 establishes an RRC connection with the user device 202 via transmission 212. The second satellite 206 transmits data via transmission 214 corresponding to a frequency band of the second satellite 206 (e.g., satellite beam 116A of satellite 114 in FIG. 1). For example, the second satellite 206 can transmit a next satellite pass parameter that is a frequency band identifier for one or more frequency bands of the second satellite 206. For example, the frequency band identifier may include a carrier frequency in MHz or channel number frequency range. As another example, the frequency band identifier can include a signal propagation characteristic (e.g., a characteristic of a travel distance indicating that the frequency band is a lower or higher frequency band). In some embodiments, via transmission 214, the second satellite 206 transmits a next satellite pass parameter that is a duration of time until the second satellite will begin providing a service to the user device 202. In some embodiments, via transmission 214, the second satellite 206 transmits a next satellite pass parameter that is a particular time frame in which the second satellite will begin providing a service to the user device 202. In some embodiments, the second satellite 206 may provide the first satellite 204 with next satellite pass parameters each corresponding to a different service for the user device 202.

Based on establishing the RRC connection with the user device 202, the first satellite 204 transmits a message to the user device 202 via transmission 216. In some embodiments, the message includes a next satellite pass parameter in a first field of the message and a time to live parameter within a second field of the message. For example, the time to live parameter may correspond to a future time that the first satellite 204 will stop providing a service to the user device 202, via a frequency band, within a particular geographical area in which the user device 202 is located. In some embodiments, the time to live parameter corresponds to a remaining duration of time in which the first satellite 204 will provide the service to the user device 202, via the frequency band, within the particular geographical area. Further, in some embodiments, the first field having the next satellite pass parameter corresponds to the transmission 214. In addition, in some embodiments, the message includes a third field having a second next satellite pass parameter, wherein the next satellite pass parameter of the first spare field is a duration of time until the second satellite 206 will begin to provide a service to the user device 202, and wherein the second next satellite pass parameter of the third spare field is a carrier frequency (e.g., in MHz) or a channel number frequency range.

Based on receiving the message, the user device 202 initiates an action. For example, the action may include initiating, by the user device 202, a timer associated with scanning for a frequency band of the second satellite 206, the timer being based on the time in which the second satellite 206 will begin to provide service to the user device 202. In some embodiments, the action includes scanning, by the user device 202, based on receiving the message having the spare field that includes the frequency band identifier of the second satellite 206, such that the user device 202 is scanning for the particular frequency band of the second satellite 206 rather than scanning for another frequency band. In some embodiments, the action includes transmitting an RRC connection request to the second satellite 206 based on receiving a next satellite pass parameter. In some embodiments, the action initiated by the user device 202 is also based on the one or more other fields having information related to the first satellite 204, the second satellite 206 (e.g., corresponding to transmission 214), or one or more combinations thereof. For example, the action may be initiated based on the user device 202 receiving a service gap parameter within a spare field, the service gap parameter indicating a period of time (e.g., 12:31:03 to 12:32:05) in which the user device will not receive service from the first satellite 204 and the second satellite 206.

Turning to FIG. 3, example RRC connection release message 300 (e.g., transmitted via E-UTRAN to a user device) having a field including a next satellite pass parameter. For example, the field may include one or more of spare3 NULL, spare2 NULL, spare1 NULL within the example RRC connection release message 300. In an embodiment, a satellite having an RRC connection with the user device (e.g., an active RRC connection or an idle RRC connection) can transmit example RRC connection release message 300 to the user device (e.g., via E-UTRAN), wherein one or more of the spare3 NULL, spare2 NULL, spare1 NULL include the next satellite pass parameter. For example, the next satellite pass parameter may correspond to a service provided by a satellite different from the satellite having the RRC connection with the user device.

In some embodiments, the satellite having the RRC connection with the user device (e.g., an active RRC connection or an idle RRC connection) can transmit example RRC connection release message 300 to the user device (e.g., via E-UTRAN), wherein at least one of the spare3 NULL, spare2 NULL, spare1 NULL include one or more next satellite pass parameters and a time to live parameter. For example, the time to live parameter can correspond to a future time that the satellite, having the RRC connection with the user device, will stop providing a service to the user device. As another example, the time to live parameter can correspond to a remaining duration of time in which the satellite, having the RRC connection with the user device, will provide a service to the user device.

By way of illustration and as a non-limiting example, the user device can establish an RRC connection with a first satellite at 12:00 pm Eastern Time Zone corresponding to the United States. At 12:00:30 pm, the first satellite can send the RRC connection release message 300 to the user device, the RRC connection release message including a time to live parameter indicating that the user device has 30 seconds until the first satellite will no longer provide service to the user device, a next satellite pass parameter indicating that the user device has 330 seconds until the second satellite will provide the service to the user device, and another next satellite pass parameter indicating that the second satellite will provide service to the user device via a particular frequency or channel (e.g., LTE channel number 8665).

In this way, the user device is informed that the first satellite will provide coverage to the user device until 12:01 pm. In embodiments, the user device can provide a notification (e.g., via a graphical user interface) to a user of the user device indicating how much longer the user has to use service and how long the user will have to wait until being able to use service again. Based on the fields within the message, the user device can initiate the action of setting an internal timer for 330 seconds to initiate scanning for the LTE channel number 8665. Based on providing the user device with the next satellite pass parameters and the time to live parameter, the user device may receive selections or perform one or more operations before the remaining thirty seconds have ended. For example, the user device may transmit an SMS message before the remaining thirty seconds end. Based on the user device transmitting the SMS message (or performing another transmission via a service provided the first satellite), the first satellite can transmit another message (e.g., an RRC connection release message) that includes an updated next satellite pass parameter (e.g., the updated next satellite pass parameter being 315 seconds until the second satellite will start providing service to the user device) and an updated time to live parameter (e.g., the updated time to live parameter being 15 seconds until the first satellite will stop providing service to the user device) within a field (e.g., spare3 NULL, spare2 NULL, spare1 NULL).

Based on receiving the next satellite pass parameter, the user device can set the internal timer such that the user device will not scan for any technologies, bands, frequencies, etc. until the remaining 315 seconds. Additionally, based on receiving the next satellite pass parameter corresponding to LTE channel number 8665, the user device can particularly scan for LTE channel number 8665 after the 315 seconds, such that the user device will not scan for any unrelated or unavailable technologies, bands, frequencies, etc. In this way, the user device preserves battery resources and other resource capabilities and thereby enhancing battery life, component functionality, and user device experience. Additionally, this also allows for users of user devices to better plan for timing and duration of calls and data sessions. As such, the present technology and corresponding techniques further enhance the reliability and functionality of communications.

Example Flowcharts

Figure 4:
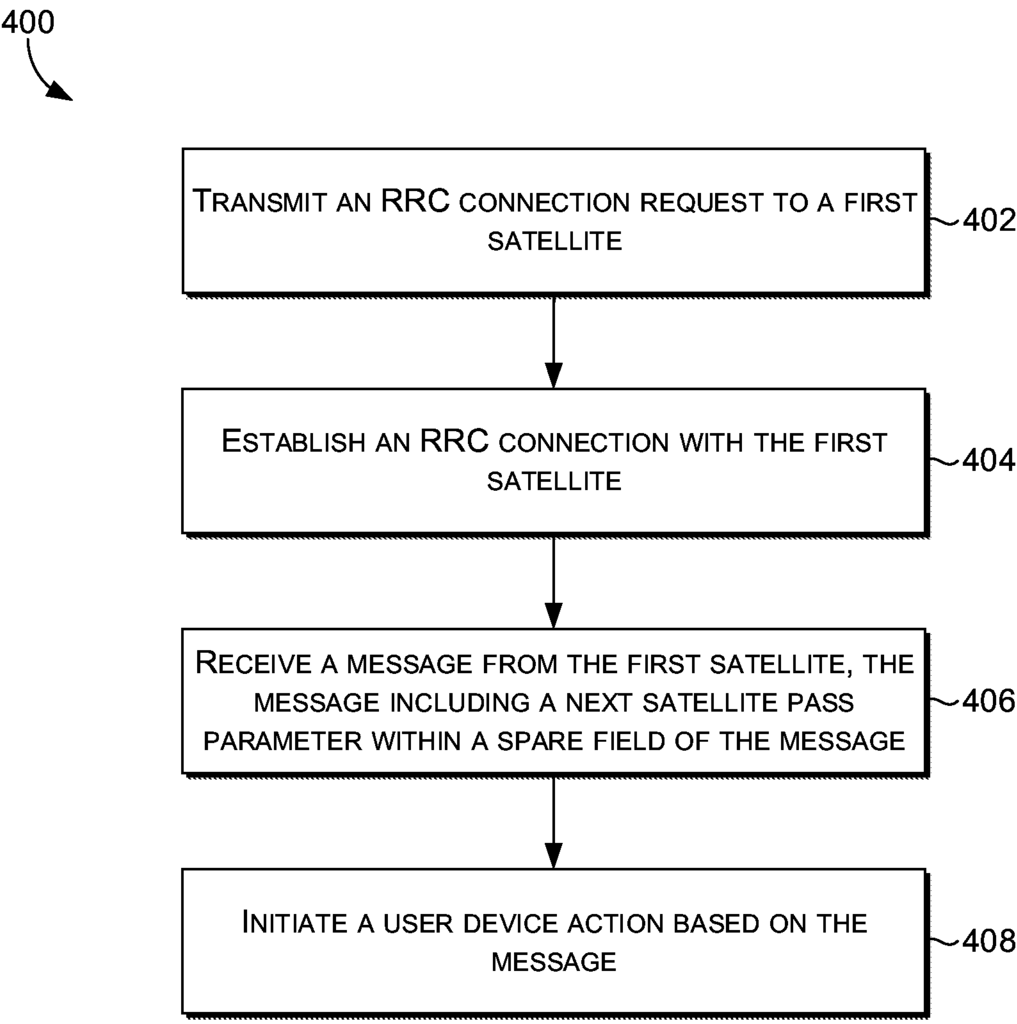
FIG. 4 illustrates an example flowchart for improved satellite coverage from the perspective of a user device, in accordance with aspects herein.

Having described the example embodiments discussed above, an example flowchart is described below with respect to FIG. 4. Example flowchart 400 begins at 402 with the user device transmitting an RRC connection request to a satellite (e.g., based on 3GPP TS 36.331 version 15.3.0 Release 15). At 404, the user device, located at particular geographical area, can establish a radio resource control (RRC) connection with a first satellite. Based on establishing the RRC connection with the satellite, at 406, the user device can receive a message including a next satellite pass parameter within a field of the message. In embodiments, the next satellite pass parameter corresponds to a next satellite pass of the user device from the first satellite to a second satellite. In some embodiments, the next satellite pass parameter can correspond to time at which the second satellite will provide a service, via a frequency band, to the user device within the particular geographical area. In some embodiments, the next satellite pass parameter is a duration of time until the second satellite will provide a service to the user device within the particular geographical area. In some embodiments, the message further includes a duration of time until the user device is within a threshold range of the frequency band of the second satellite, the duration of time being within a second field of the message. Additionally or alternatively, in some embodiments, the message further includes a frequency band identifier for a frequency band corresponding to the service provided to the user device by the second satellite, the frequency band identifier being within a second field.

At 408, the user device initiates an action based on receiving the message. In some embodiments, the action includes initiating a timer associated with scanning for the frequency band of the second satellite, the timer being based on the time in which the second satellite will provide the service to the user device. In some embodiments, the action includes scanning, by the user device, based on the frequency band identifier of the frequency band of the second satellite, the frequency band identifier being provided within a field of the message. In some embodiments, the user device the user device initiates the scanning upon the duration of time, before the second satellite begins providing service to the user device, ending. In some embodiments, the action includes transmitting an RRC connection request to the second satellite based on receiving the message and based on the duration of time before the second satellite begins providing service to the user device. For example, the user device may transmit the RRC connection request to the second satellite further based on the frequency band identifier.

Figure 5:
FIG. 5 illustrates an example flowchart for improved satellite coverage from the perspective of a satellite, in accordance with aspects herein.
Figure 5:
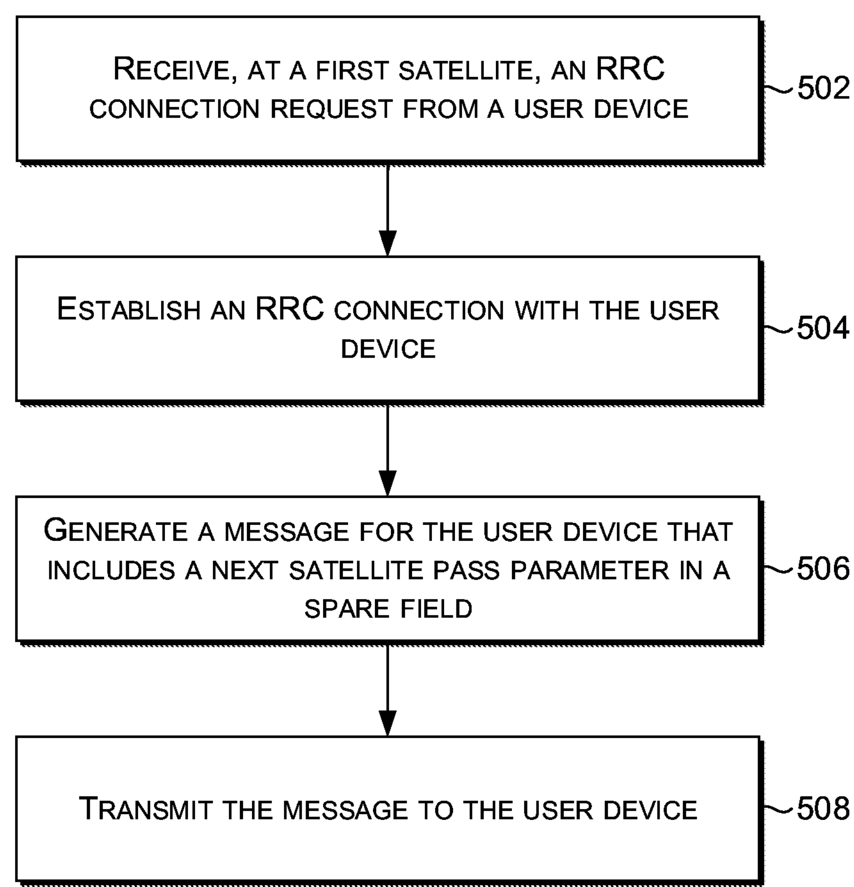

Turning to FIG. 5, example flowchart 500 begins at 502 with a first satellite receiving an RRC connection request from a user device. Based on receiving the RRC connection request, the first satellite at 504 establishes a first RRC connection with the user device located within a particular geographical area. At 506, the first satellite generates a message including a next satellite pass parameter within a field of the message. For example, the next satellite pass parameter can correspond to a service provided by a second satellite, via a frequency band, to the user device within the particular geographical area. As another example, the next satellite pass parameter can correspond to a next satellite pass of the user device from the first satellite to a second satellite. In a non-limiting example, the next satellite pass parameter may be a frequency band identifier for the frequency band of the second satellite. As another example, the next satellite pass parameter may be a duration of time (e.g., 330 seconds) until the second satellite will provide the service to the user device within the particular geographical area. In yet another example, the next satellite pass parameter may be a particular time (e.g., 13:01:45) at which the second satellite will provide the service to the user device within the particular geographical area.

In embodiments, the message is an RRC connection release message. In embodiments, the message further includes, within a second field, a service gap parameter corresponding to a duration of time that neither the first satellite nor the second satellite will provide service to the user device within the particular geographical area. In an embodiment, the next satellite pass parameter within a first field of the message is a duration of time until the second satellite will provide a service to the user device, and the message also includes a second field having a frequency band identifier for the frequency band of the second satellite, and a third field having a service gap parameter indicating a period of time in which the user device will not receive service from the first satellite and the second satellite.

In some embodiments, the next satellite pass parameter is determined based on large-scale parameters (line-of-sight probability, angular spread, delay spread, etc.) and an elevation angle of the second satellite relative to the position of the user device, path loss associated with a frequency band of the second satellite providing the service, attenuation from an object (e.g., a tree on a mountain), an absorption by one or more atmospheric gases (e.g., nitrogen, oxygen, argon, carbon dioxide, neon, helium, methane, krypton, ozone, hydrogen, water vapor) between the user device and the second satellite, ionospheric scintillation loss, tropospheric scintillation loss, a solar activity level, an orbit of the second satellite, another next satellite pass factor, or one or more combinations thereof.

At 508, the first satellite transmits the message including the next satellite pass parameter to the user device. In some embodiments, based on transmitting the message to the user device and prior to the duration of time, until the second satellite will provide the service to the user device, ending: the first satellite establishes a second RRC connection between the first satellite and the user device and transmits an RRC connection release message to the user device, the RRC connection release message including an updated duration of time, within a field of the RRC connection release message, until the second satellite will provide the service to the user device, the updated duration of time being a shorter time than the duration of time provided in the initial message. In some embodiments, the first satellite can establish a second RRC connection with the user device based on transmitting the message to the user device and prior to the period of time in which the user device will not receive service from the first satellite and the second satellite.

In some embodiments, the first satellite may receive a first message from the user device, the first message including a first location of the user device within a first field of the first message. Additionally, the first satellite can receive a second message from the user device, the second message including a second location of the user device within a second field of the second message. Based on the first location, the second location, and a time at which the first message and the second message were received, the first satellite can determine the next satellite pass parameter to include in the field of the message. As an example, in some embodiments, the first satellite can determine the next satellite pass parameter to include in the field of the message based on determining a location of the user device (e.g., the location included in an RRC connection request received by the first satellite or based on a Satellite Positioning System or Global Navigation Satellite System, such as GPS, GLObalnaya NAvigatsionnaya Sputnikovaya Sistema, Galileo, BeiDou, Indian Regional Navigation Satellite System, European Geostationary Navigation Overlay Service, Wide Area Augmentation System, another type of positioning technique, or one or more combinations thereof).

Example Satellite

Having described the example embodiments discussed above of the presently disclosed technology, an example operating environment of an example satellite (e.g., satellite 110 or 114 of FIG. 1, satellite 204 or 206 of FIG. 2) is described below with respect to FIG. 6. Example environment 600 is but one example of a suitable satellite environment, and is not intended to suggest any particular limitation as to the scope of use or functionality of the technology disclosed. Neither should satellite 602 be interpreted as having any dependency or requirement relating to any particular component illustrated, or a particular combination of the components illustrated in FIG. 6.

As illustrated in FIG. 6, example satellite 602 includes antenna(s) 604, transponder(s) 606, power system(s) 608, an orientation and stabilization system 610, sensor(s) 612, database(s) 614, message generator(s) 616, propulsion system 618, and processor(s) 620. The antenna(s) 604 of the satellite 602 can be configured to communicate with user devices, gateways, other satellites, other nodes, or one or more combinations thereof. The antenna(s) 604 may be based on one or more antenna elements (e.g., monopoles or dipoles, loop antennas, helical antennas, patch antennas, inverted-F antennas, Yagi antennas, slot antennas, horn antennas, cavity antennas) and can be used in one or more antenna arrays (e.g., phased antenna arrays, fixed direct radiating arrays, deployable direct radiating antenna arrays, space fed arrays, reflector fed arrays).

Transceiver circuitry of the satellite 602 may include transponder(s) 606 capable of receiving uplink signals and capable of transmitting downlink signals. For example, the transponder(s) 606 may receive, amplify, or retransmit one or more signals between the satellite 602 and a gateway or user device, for example. As another example, one or more of the transponder(s) 606 can operate within a particular frequency band. In some embodiments, the transponder(s) 606 can perform a bent-pipe transmission. In some embodiments, one or more of the transponder(s) 606 can operate in a single-channel per carrier mode, a time-division multiple access mode, another type of mode, or one or more combinations thereof.

The power system(s) 608 can supply power to the satellite 602. For example, the power system(s) 608 may include one or more solar panels, one or more arrays of solar panels, power regulator circuitry, one or more batteries (e.g., silver zinc cell, lithium cell, solar cell), another type of power system component, or one or more combinations thereof. The power system(s) may also store electrical power generated from solar energy. The orientation and stabilization system 610 can act as a stabilizer (e.g., spin stabilization or three-axis (e.g., yaw axis, roll axis, and pitch axis) stabilization). The orientation and stabilization system 610 may also modify or control the spin and rotation of the satellite 602 (e.g., speed of rotation).

The sensor(s) 612 may include a sun sensor for detecting the director or position of the sun, an earth sensor for detecting the direction or position of the earth, light-based sensors (e.g., infrared sensors, visible light sensors, ultraviolet sensors), LIDAR, radar, backscattered light or backscattered radio-frequency signal sensors, temperature sensors, radiation sensors, accelerometers, gyroscopes, magnetic sensors, spectrometers, microwave sensors, particle detectors, another type of sensor, or one or more combinations thereof. The database(s) 614 may include one or more of a telemetry database, a payload database, an orbital database, a command and control database, a mission planning database, a reference database (e.g., for storing celestial data), a ground station database (e.g., for storing data from communications with terrestrial devices), another type of database, or one or more combinations thereof.

The message generator(s) 616 can generate a message for transmission to user devices. For example, the message generator(s) 616 can generate data within one or more fields of the message (e.g., an RRC connection release message). In embodiments, the message generator(s) 616 can generate a message having a next satellite pass parameter within the field. The next satellite pass parameter may correspond to a service provided by another satellite, via a frequency band, to the user device that is located within a particular geographical area. As another example, the next satellite pass parameter can correspond to a next satellite pass of the user device from a first satellite to a second satellite. In embodiments, the next satellite pass parameter is determined based on one or more of the antenna(s) 604, transponder(s) 606, power system(s) 608, orientation and stabilization system 610, sensor(s) 612, database(s) 614, message generator(s) 616, propulsion system 618, processor(s) 620, or one or more combinations thereof.

The propulsion system 618 can control the orbit of the satellite 602. For example, the propulsion system 618 can correspond to chemical propulsion, electric propulsion, compressed gas propulsion, hybrid propulsion, another type of propulsion, or one or more combinations thereof. The processor(s) 620 can be utilized by or for one or more of the antenna(s) 604, transponder(s) 606, power system(s) 608, orientation and stabilization system 610, sensor(s) 612, database(s) 614, message generator(s) 616, propulsion system 618, another satellite component, or one or more combinations thereof. For example, the processor(s) 620 can process sensor data and determine the next satellite pass parameter. In an example embodiment, the processor(s) 620 can be a central processing unit, a digital signal processor, a field-programmable gate array, a graphics processing unit, a system-on-chip, a radiation-tolerant processor, another type of processor, or one or more combinations thereof.

Example User Device

Having described the example embodiments discussed above of the presently disclosed technology, an example operating environment of an example user device (e.g., user device 102 of FIG. 1) is described below with respect to FIG. 7. User device 700 is but one example of a suitable computing environment, and is not intended to suggest any particular limitation as to the scope of use or functionality of the technology disclosed. Neither should user device 700 be interpreted as having any dependency or requirement relating to any particular component illustrated, or a particular combination of the components illustrated in FIG. 7.

As illustrated in FIG. 7, example user device 700 includes a bus 702 that directly or indirectly couples the following devices: memory 704, one or more processors 706, one or more presentation components 708, one or more input/ output (I/O) ports 710, one or more I/O components 712, a power supply 714, and one or more radios 716.

Bus 702 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component, such as a display device, to be an I/O component. Also, processors have memory. Accordingly, FIG. 7 is merely illustrative of an exemplary user device that can be used in connection with one or more embodiments of the technology disclosed herein.

User device 700 can include a variety of computer-readable media. Computer-readable media can be any available media that can be accessed by user device 700 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 704 includes computer storage media in the form of volatile and/or nonvolatile memory. The memory 704 may be removable, non-removable, or a combination thereof. Example hardware devices of memory 704 may include solid-state memory, hard drives, optical-disc drives, other hardware, or one or more combinations thereof. As indicated above, the computer storage media of the memory 704 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 700, or one or more combinations thereof.

The one or more processors 706 of user device 700 can read data from various entities, such as the memory 704 or the I/O component(s) 712. The one or more processors 706 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 706 can execute instructions, for example, of an operating system of the user device 700 or of one or more suitable applications.

The one or more presentation components 708 can present data indications via user device 700, another user device, or a combination thereof. Example presentation components 708 may include a display device, speaker, printing component, vibrating component, another type of presentation component, or one or more combinations thereof. In some embodiments, the one or more presentation components 708 may comprise one or more applications or services on a user device, across a plurality of user devices, or in the cloud. The one or more presentation components 708 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 710 allow user device 700 to be logically coupled to other devices, including the one or more I/O components 712, some of which may be built in. Example I/O components 712 can include a microphone, joystick, game pad, satellite dish, scanner, printer, wireless device, and the like. The one or more I/O components 712 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 708 on the user device 700. In some embodiments, the user device 700 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 700 may, additionally or alternatively, be equipped with accelerometers or gyroscopes that enable detection of motion. In some embodiments, the output of the accelerometers or gyroscopes may be provided to the one or more presentation components 708 of the user device 700 to render immersive augmented reality or virtual reality.

The power supply 714 of user device 700 may be implemented as one or more batteries or another power source for providing power to components of the user device 700. In embodiments, the power supply 714 can include an external power supply, such as an AC adapter or a powered docking cradle that supplements or recharges the one or more batteries. In aspects, the external power supply can override one or more batteries or another type of power source located within the user device 700.

Some embodiments of user device 700 may include one or more radios 716 (or similar wireless communication components). The one or more radios 716 can transmit, receive, or both transmit and receive signals for wireless communications. In embodiments, the user device 700 may be a wireless terminal adapted to receive communications and media over various wireless networks. User device 700 may communicate using the one or more radios 716 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 716 may facilitate communication via radio frequency signals, frames, blocks, transmission streams, packets, messages, data items, data, another type of wireless communication, or one or more combinations thereof. The one or more radios 716 may be capable of transmitting, receiving, or both transmitting and receiving wireless communications via mm waves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for enhancing satellite coverage, the system comprising:

one or more processors corresponding to a first satellite; and computer memory storing computer-usable instructions that, when executed by the one or more processors, cause the one or more processors to perform operations comprising:

receiving a radio resource control (RRC) connection request from a user device, the user device being located within a particular geographical area;

establishing, by the first satellite and based on the RRC connection request, a radio resource control (RRC) connection between the first satellite and the user device; and transmitting, by the first satellite, a message to the user device, the message including a next satellite pass parameter within a field of the message, the next satellite pass parameter corresponding to a service provided by a second satellite, via a frequency band, to the user device within the particular geographical area.

2. The system according to claim 1, wherein the message is an RRC connection release message.

3. The system according to claim 1, wherein the next satellite pass parameter is a frequency band identifier for the frequency band of the second satellite.

4. The system according to claim 1, wherein the next satellite pass parameter is a duration of time until the second satellite will provide the service to the user device within the particular geographical area.

5. The system according to claim 4, wherein the message further includes, within a second field, a service gap parameter corresponding to a duration of time that neither the first satellite nor the second satellite will provide the service to the user device within the particular geographical area.

6. The system according to claim 4, wherein the operations further comprise:

based on transmitting the message to the user device and prior to the duration of time, until the second satellite will provide the service to the user device, ending:

establishing a second RRC connection between the first satellite and the user device; and based on the second RRC connection, transmitting an RRC connection release message to the user device, the RRC connection release message including an updated duration of time, within a field of the RRC connection release message, until the second satellite will provide the service to the user device, the updated duration of time being a shorter time than the duration of time.

7. The system according to claim 1, the operations further comprising:

receiving a first message from the user device, the first message including a first location of the user device within a first field of the first message;

receiving a second message from the user device, the second message including a second location of the user device within a second field of the second message; and based on the first location, the second location, and a time at which the first message and the second message were received, determining the next satellite pass parameter to be included in the field of the message.

8. The system according to claim 7, wherein the next satellite pass parameter is a particular time at which the second satellite will provide the service to the user device within the particular geographical area.

9. A method for enhancing satellite coverage, the method comprising:

receiving, by a first satellite, a radio resource control (RRC) connection request from a user device located within a particular geographical area;

establishing, by the first satellite and based on the RRC connection request, a first radio resource control (RRC) connection between the first satellite and the user device; and transmitting, by the first satellite, a message to the user device, the message including a next satellite pass parameter within a field of the message, the next satellite pass parameter corresponding to a next satellite pass of the user device from the first satellite to a second satellite.

10. The method according to claim 9, wherein the next satellite pass parameter is a duration of time until the second satellite will provide a service to the user device, via a frequency band, within the particular geographical area.

11. The method according to claim 10, wherein the message further includes a second field having a frequency band identifier for the frequency band of the second satellite.

12. The method according to claim 11, wherein the message further includes a third field having a service gap parameter indicating a period of time in which the user device will not receive service from the first satellite and the second satellite.

13. The method according to claim 12, further comprising establishing a second RRC connection between the first satellite and the user device based on transmitting the message to the user device and prior to the period of time in which the user device will not receive service from the first satellite and the second satellite.

14. The method according to claim 9, further comprising determining the next satellite pass parameter to be included in the field of the message based on determining a location of the user device.

15. One or more non-transitory computer storage media having computer-executable instructions embodied thereon, that when executed by at least one processor, cause the at least one processor to perform a method comprising:

transmitting, by a user device located at a particular geographical area, a radio resource control (RRC) connection request to a first satellite;

establishing, based on the RRC connection request, a radio resource control (RRC) connection between the user device and a first satellite;

receiving, via the user device, a message from the first satellite, the message including a next satellite pass parameter within a field of the message, the next satellite pass parameter corresponding to a next satellite pass of the user device from the first satellite to a second satellite; and causing an action by the user device based on the user device receiving the message.

16. The one or more non-transitory computer storage media of claim 15, wherein the next satellite pass parameter corresponds to time at which the second satellite will provide a service, via a frequency band, to the user device within the particular geographical area, and wherein the action includes initiating, by the user device, a timer associated with scanning for the frequency band, the timer being based on the time in which the second satellite will provide the service.

17. The one or more non-transitory computer storage media of claim 15, wherein the next satellite pass parameter is a frequency band identifier for a frequency band that the second satellite is transmitting for the particular geographical area, and wherein the action includes scanning, by the user device, based on the frequency band identifier.

18. The one or more non-transitory computer storage media of claim 17, wherein the message further includes a duration of time until the user device is within a threshold range of the frequency band of the second satellite, the duration of time being within a second field of the message, and wherein the user device initiates the scanning upon the duration of time ending.

19. The one or more non-transitory computer storage media of claim 15, wherein the next satellite pass parameter is a duration of time until the second satellite will provide a service to the user device within the particular geographical area, and wherein the action includes transmitting an RRC connection request to the second satellite based on receiving the message and based on the duration of time.

20. The one or more non-transitory computer storage media of claim 19, wherein the message further includes a frequency band identifier for a frequency band corresponding to the service provided to the user device by the second satellite, the frequency band identifier being within a second field, and wherein the user device transmits the RRC connection request to the second satellite further based on the frequency band identifier.

* * * * *